United States Patent [19]

Shima et al.

[11] Patent Number: 5,331,144
[45] Date of Patent: Jul. 19, 1994

[54] CARD READER-WRITER

[75] Inventors: Yasuo Shima; Makoto Ukai, both of Kawasaki, Japan

[73] Assignee: Kabushiki Kaisha Toshiba, Kawasaki, Japan

[21] Appl. No.: 98,156

[22] Filed: Jul. 28, 1993

Related U.S. Application Data

[63] Continuation of Ser. No. 711,853, Jun. 7, 1991, abandoned.

[30] Foreign Application Priority Data

Jun. 7, 1990 [JP] Japan .................. 2-147483

[51] Int. Cl.5 .............................................. G06K 7/00
[52] U.S. Cl. ................................. 235/486; 235/483; 235/485
[58] Field of Search ................. 235/479, 483, 485, 486

[56] References Cited

U.S. PATENT DOCUMENTS

| | | | |
|---|---|---|---|
| 3,653,323 | 4/1972 | McCowan | 235/486 |
| 3,984,049 | 10/1976 | Shawan | 235/486 |
| 4,480,181 | 10/1984 | Fisher | 235/486 |
| 4,800,258 | 1/1989 | Suzuki | 235/479 |
| 4,900,908 | 2/1990 | Tsutsui | 235/479 |
| 4,904,852 | 2/1990 | Mita et al. | 235/479 |
| 4,935,916 | 6/1990 | Suzuki et al. | 235/479 |
| 5,036,184 | 7/1991 | Susaki | 235/479 |
| 5,130,521 | 7/1992 | Shino et al. | 235/479 |

FOREIGN PATENT DOCUMENTS

| | | |
|---|---|---|
| 0156972 | 10/1985 | European Pat. Off. . |
| 0356121 | 2/1990 | European Pat. Off. . |
| 0356243 | 2/1990 | European Pat. Off. . |
| 2534578 | 2/1977 | Fed. Rep. of Germany . |
| 5538713 | 10/1980 | Japan . |
| 2137393 | 10/1984 | United Kingdom . |
| WO 81/03562 | 12/1981 | World Int. Prop. O. . |
| WO83/00245 | 1/1983 | World Int. Prop. O. . |

Primary Examiner—Harold Pitts
Attorney, Agent, or Firm—Oblon, Spivak, McClelland, Maier & Neustadt

[57] ABSTRACT

A card reader-writer includes a body provided with a card inserting opening into which a card to which reading and writing of information can be made is inserted, magnetic heads arranged in the body to read and write information from and on the card, and a device for carrying the card which is inserted into the card inserting opening to the magnetic heads. The carrying device includes a card chucking unit for chucking the card and a carriage for moving the chucking unit along a certain passage. The position of the card chucked by the chucking unit is corrected by a card position adjusting or correcting unit.

34 Claims, 7 Drawing Sheets

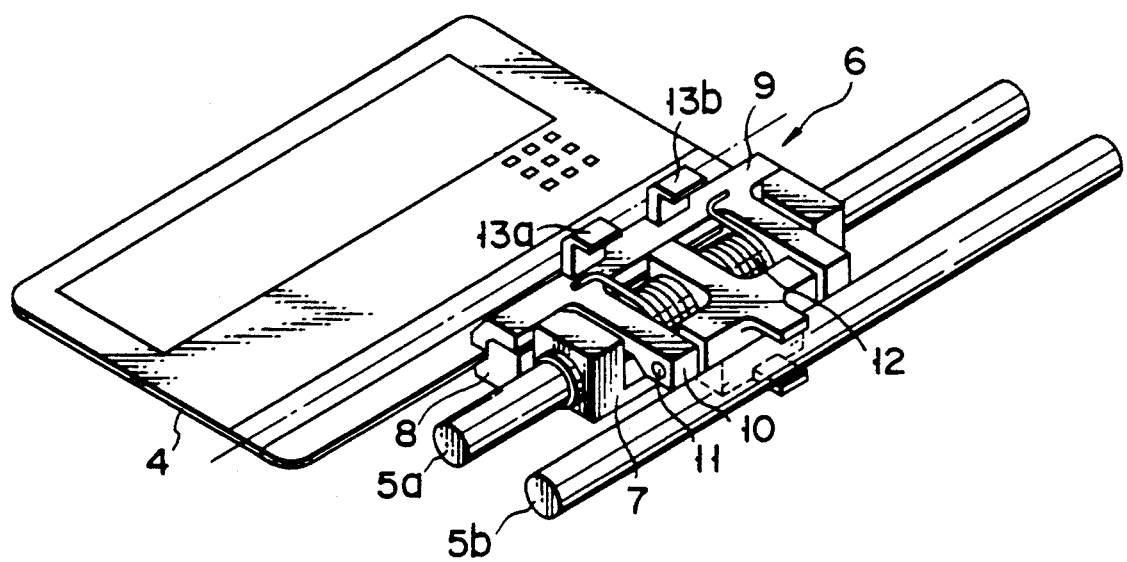
F I G. 2
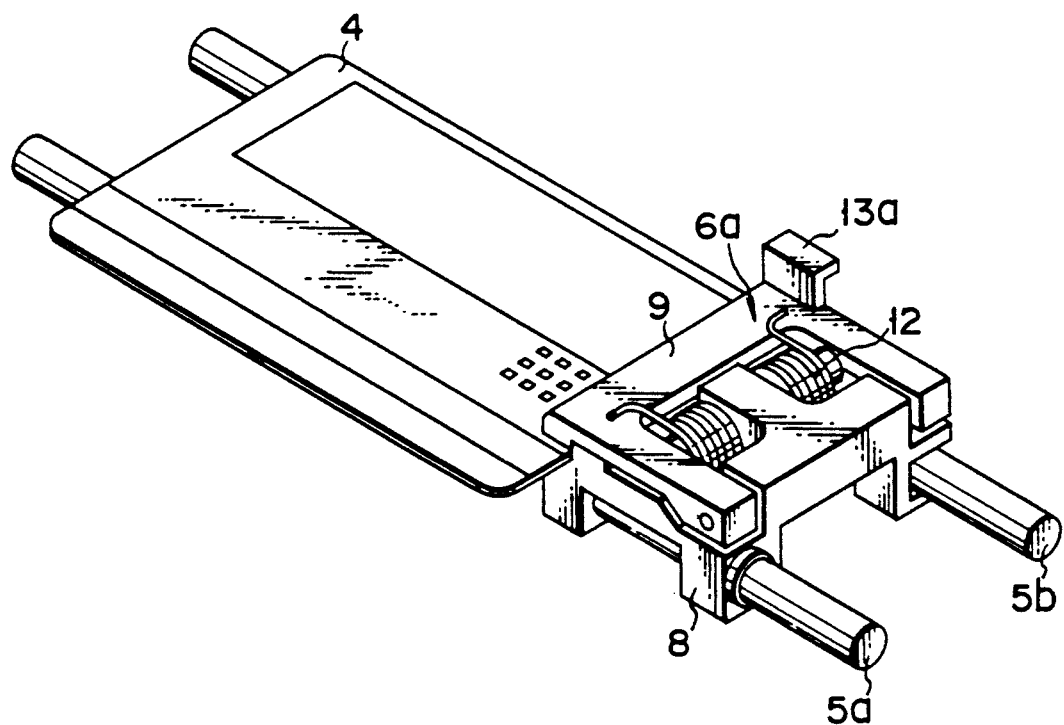
F I G. 3

CARD READER-WRITER

This application is a continuation of application Ser. No. 07/711,853, filed on Jun. 7, 1991, now abandoned.

BACKGROUND OF THE INVENTION

1. Field of the Invention

The present invention relates to a card reader writer for transmitting and receiving information to and from magnetic and IC cards.

2. Description of the Related Art

Automatic monetary machines such as the cash dispenser (CD) and the automatic teller machine (ATM) which use magnetic and IC cards as their information recording media have been developed to save and speed up business works at the front of financial agencies such as the bank, post office and credit bank.

These automatic monetary machines need no person attended or in charge. Therefore, they have been improved day by day to need no maintenance and enhance their reliability so as to allow any customer to use them with a sense of relief even on holiday. Particularly when the card reader-writer is jammed by the card on holiday, the situation becomes critical because the card cannot be returned to the customer. In order to avoid this, therefore, the card reader-writer is provided with various measures.

The conventional card reader-witer has a card inserting opening in the center of one side of its frame and the card is selectively inserted into this card inserting opening. Magnetic stripes are formed on the top and underside of the card. Take-in rollers for taking the card inserted into the card inserting opening into the card reader-writer are arranged one upon the other in the frame and adjacent to the card inserting opening.

On the other hand, a group of paired carrying rollers is arranged behind the take-in rollers in the frame in such a way that the paired carrying rollers are opposed to each other in the vertical direction. Each of these carrying and take-in rollers is made of rubber or plastics. Further, magnetic heads are located adjacent to the carrying rollers, opposing to each other in the vertical direction with a certain magnetic gap interposed between them. The carrying and take-in rollers are driven commonly by a motor.

The card inserted into the card inserting opening is taken into the card reader-writer by the take-in rollers and carried backward between the front paired carrying rollers. This card is carried backward by pressing force created between the carrying rollers by springs and by friction created by the carrying rollers rotated. In this case, the card is carried to the area paired carrying rollers while spreading the upper and lower magnetic heads. When the card passes between the magnetic heads in this manner, the magnetic heads read information recorded on the magnetic stripe on the card and write information on the magnetic stripe thereon. When a series of these processes is finished, the card is returned to the card inserting opening and then back to the customer.

In the case of the conventional card reader-writer arranged as described above, however, the card is frictionally carried using frictional force between the rubber- or plastics-made take-in rollers and between the rubber- or plastics-made carrying rollers and the card. Therefore, the frictional force changes depending upon the surface state of each of the rollers, that of the card and material of which the card is made. In addition, each of the rollers repeats its elastic deformation every time the card is carried between the rollers. As the result, the card carrying velocity cannot be kept certain, thereby preventing reading and writing of magnetic information from being accurately achieved.

Further, the card is successively carried backward by three pairs of the carrying rollers and every time it is taken between the paired carrying rollers, it is impacted by the rollers and thus vibrated. The stability of carrying the card is thus lowered, thereby making it impossible to accurately read and write the magnetic information.

Furthermore, when the carrying rollers are used for a long time without adding any maintenance to them, dust, oil and the others adhere to their surface to thereby lower their card carrying capacity. In the worst case, they cannot carry the card.

In the case of the IC-incororated card, the magnetic stripe, the embossed portion and the IC node portion are arranged adjacent to one another on the card in the width direction thereof. This allows the card to be sandwiched between the carrying rollers only at such an area of the card that extends about 2-3 mm from one side edge of the card in the width direction thereof. It is therefore feared that the card carrying capacity of the carrying rollers is further lowered.

As described above, the conventional card reader-writer uses the system of carrying the card by the frictional force created between the rubber-made rollers and the card. This makes it difficult to carry the card at a certain velocity. As the result, reliable reading and writing of information cannot be attained.

SUMMARY OF THE INVENTION

The object of the present invention is therefore to provide a card reader-writer capable of being more easily maintained but making it unnecessary to use any card carrying system which uses frictional force created by the rollers and accurately reading and writing information on a card.

This object of the present invention can be achieved by a card reader-writer comprising a body having a card inserting opening into which a card to which reading and writing of information can be made is inserted; means arranged in the body to read and write information from and on the card; means for carrying the card which is inserted into the card inserting opening to the read/write means, said carrying means including means for chucking the card and means for moving the chucking means on a certain passage; and means for adjusting or correcting the position of the card chucked by the chucking means.

According to the present invention, the card inserted into the card inserting opening is chucked by the chucking means. This card chucking means is moved along the certain passage by the moving means. The card moving velocity is determined in this case only by the velocity at which the card chucking means is moved by the moving means. Therefore, it is easier to make certain this velocity of moving the card chucking means. A more stable card carrying can be thus attained.

Further, the present invention does not employ the system of carrying the card by the frictional force created by the rubber-made rollers, for example. Even when the card reader-writer is used for a long time, therefore, its capacity of carrying the card cannot be lowered.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a perspective view showing a card chuck-system incorporated into the main portion of the card reader-writer shown in FIG. 1;

FIGS. 3 through 5 are perspective views showing variations of the card chucking system in the card reader-writer;

DETAILED DESCRIPTION OF THE PREFERRED EMBODIMENTS

Figure 1:
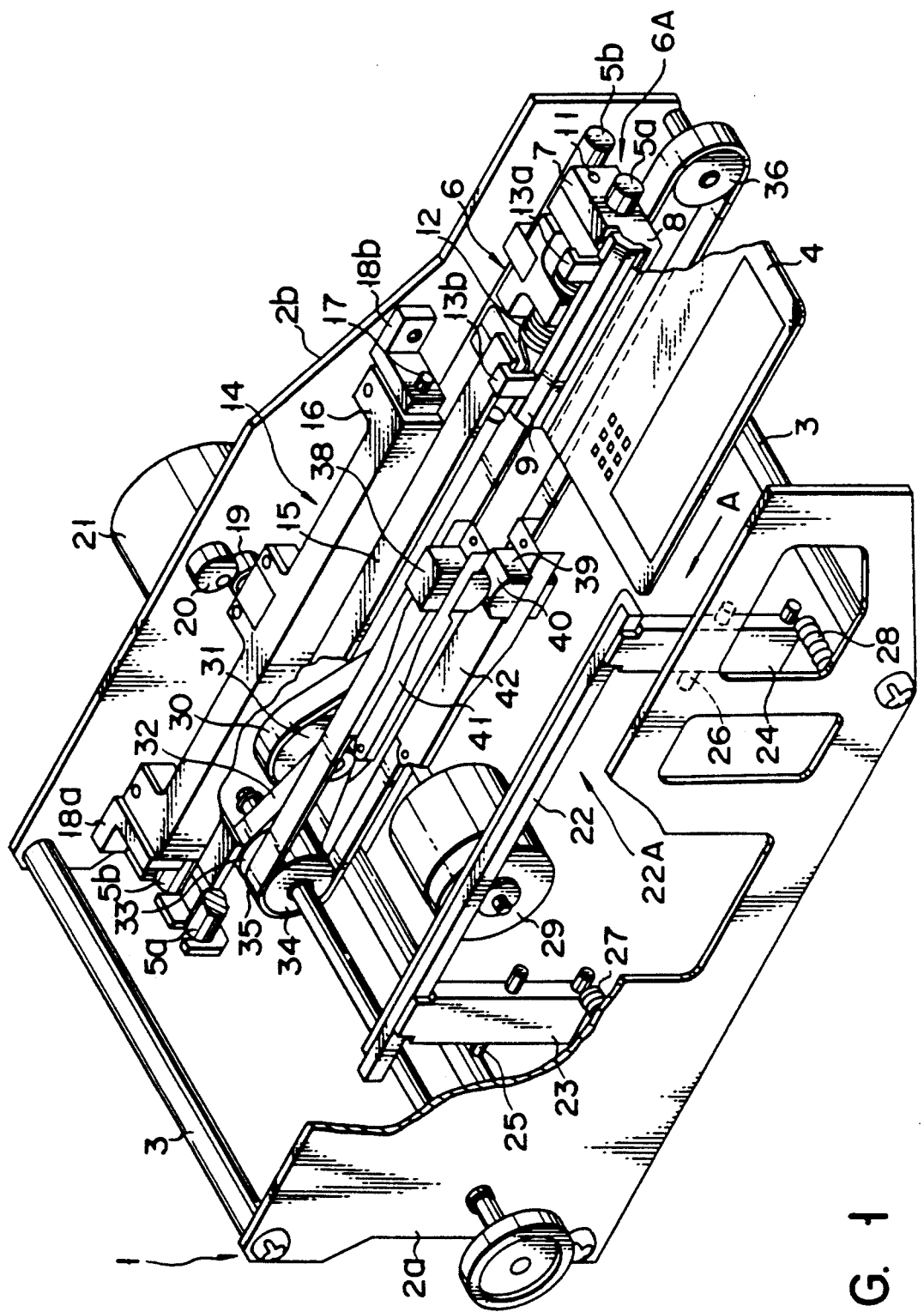
FIG. 1 is a perspective view showing the main portion of the card reader-writer according to a first embodiment of the present invention partly cut away.

Some embodiments of the present invention will be described with reference to the accompanying drawings. FIG. 1 shows the main portion of the card reader-writer according to a first embodiment of the present invention.

This card reader-writer has a frame or body 1 shaped like a rectangle when viewed from the top thereof. The frame 1 comprises side plates 2a and 2b arranged parallel to each other and plural coupling rods for coupling the side plates 2a and 2b parallel to each other.

A front panel (not shown) is located a little before right end faces of the side plates 2a and 2b in FIG. 1 and a card inserting opening (not shown) is formed at the front panel. A card 4 is selectively inserted into the card reader-writer through the card inserting opening. The card 4 is a magnetic one into which an IC is incorporated, Two guide rods 5a and 5b parallel to each other are located adjacent to the inner face of the side plate 2b and parallel to the direction in which the card 4 is inserted into the card reader-writer. A card chucking unit 6 which forms a carriage 6A is freely movably supported by the guide rods 5a and 5b.

Associating with an opening and closing unit 14 which will be described later, the card chucking unit 6 chucks one long edge portion of the card 4 in the thickness direction thereof when the card 4 is inserted into the card inserting opening longer than a certain length.

FIG. 2 shows the card chucking unit 6 more concretely. The card chucking unit 6 has a base 7 freely movably supported by the guide rods 5a and 5b. That side of the base 7 which is opposed to the side plate 2b is provided with a lower claw 8 which serves as a chucking claw. An upper claw 9 is located above the lower claw 8 and base portions 10 of this upper claw 9 are freely swingably attached to the base 7 by means of pins 11. Pre-load springs 12 which are of the torsion coil springs are interposed between the upper claw 9 and the base 7 to create a certain chucking force between the upper 9 and the lower claw 8.

The upper and lower claws 9 and 8 have chucking areas at which the long one edge portion of the card 4 is chucked between the upper and the lower claw over several millimeters in the width direction of the card 4, leaving a length of the card 4 not chucked in the longitudinal direction thereof so as to project it outside from the card inserting opening to allow the user to pick up and pull it out of the card inserting opening by his fingers. Practically, the card 4 has on it magnetic stripes extending adjacent and parallel to its long one edge portion. Therefore, the chucking areas of the upper and lower claws 9 and 8 are so shaped as to chuck the long one edge portion of the card 4 between the claws, leaving the stripes portion thereof not chucked, or more preferably chuck two thirds of the edge thereof except the striped portion thereof. Pins 13a and 13b are formed on the top of the upper claw 9, erecting parallel to the side plate 2b of the frame 1 and then bending toward it. The upper claw 9 is opened and closed relative to the lower claw 8 by the opening and closing system 14 through the pins 13a and 13b.

The opening and closing system 14 has a lever 15 located above and parallel to the guide rod 5a and selectively contacted with the undersides of the pins 13a and 13b. The lever 15 is supported by a rotary member 16 extending the inner face of the side plate 2b. Both ends of the rotary member 16 are supported by bearings 18a and 18b through pins 17. The bearings 18a and 18b are fixed to the inner face of the side plate 2b. A shaft (not shown) is projected to the side plate 2b from the center of that face of the rotary member 16 which is opposed to the side plate 2b, and a roller 19 is attached to this shaft. The roller 19 is contacted with an eccentric cam 20, which is connected to the rotating shaft of a motor 21. When the motor 21 is half rotated causing the roller 19 to be contacted with that face of the eccentric cam 20 which is located on its long diameter axis, therefore, the rotary member 16 is swung round the pins 17. The lever 15 is thus contacted with at least the pin 13b to push it upward. The upper claw 9 is thus swung against the urging springs 12 by the pin 13b. As the result, the card 4 chucked between the upper and lower claws 9 and 8 is released. When the motor 21 is further half rotated, that face of the eccentric cam 20 which is located on its short diameter axis is contacted with the roller 19. As the result, the rotary member 16 is reversely swung causing the lower and upper claws 8 and 9 to again chuck the card 4 between them. The opening and closing system 14 is made operative as described above to open and close the card chucking unit 6.

Located along the inner face of the side plate 2a is an unit 22A for adjusting or correcting the position of the card. The unit 22A has a guide member 22 for guiding the other free long edge portion of the card 4 which is not chucked by the card chucking unit 6 to position the card 4 in the width direction thereof. The guide member 22 is supported by support levers 23 and 24. Pins 25 and 26 are projected from the support levers 23 and 24, which are freely swingably supported by a support member (not shown) through the pins 25 and 26. Urging springs 27 and 28 are interposed between the side plate 2a and the lower end portion of the support plate 24 and between the side plate 2a and the lower end portion of the support lever 25, respectively, to swing the support levers 24 and 25 toward the guide rod 5a.

A motor 29 is located between the guide rod 5a and the guide member 22 and below them. The rotation force of the motor 29 is transmitted to a belt 35 via a belt 30, a pulley 31, a belt 32 and pulleys 33, 34. The belt 35 is stretched between the pulley 34 and another pulley 36 along the underside of the guide rod 5a. A part of the belt 35 is connected to the base 7 of the card chucking unit 6 through a coupling means (not shown). The motor 29, the belts and the pulleys mentioned above therefore form a drive system for moving the card chucking unit 6 along the guide rods 5a and 5b.

Magnetic heads 38 and 39 are opposed to each other in the vertical direction between the guide rod 5a and the guide member 22, having such a certain gap 40 between them as allows them to contact magnetic stripes on the top and underside of the card 4. They are supported by suspensions 41 and 42 so as to move in their rolling direction and in the direction of the gap 40 between them. The suspensions 41 and 42 are arranged to add contact pressure to them through plate or coil springs so that they may be stably contacted with the card 4.

Sensors and a control circuit are not shown in FIG. 1 but they cooperate with one another to serve as will be described later.

The operation of the card reader-writer which is arranged as described above will be described.

When it is under normal state, the card chucking unit 6 is waiting at such a position as shown in FIG. 1 on the side of the card inserting opening. When it is under this waiting state. The lower and upper claws 8 and 8 are kept open by the opening and closing system 14.

When the card 4 is inserted into the card reader-writer through the card inserting opening and its one long edge portion is positioned between the upper 9 and the lower claw 8 over its certain length, this state is detected by the sensor. The motor 21 of the opening and closing system 14 is half rotated in responsive to output applied from the sensor. The lever 15 is thus lowered and the upper claw 9 is swung by the urging springs 12. As the result, the long one edge portion of the card 4 is chucked between the upper 9 and the lower claw 8 with certain force.

When this card chucking operation is finished, the motor 29 starts its rotation. The belt 35 is thus run by this rotation of the motor 29. The card chucking unit 6 is therefore moved in a direction shown by an arrow A in FIG. 1, causing the card 4 to be moved in the same direction. The vibration of the card 4 which is likely to be caused in a direction vertical to the card-conveying direction is prevented by the guide member 22, so that the card 4 can be stably conveyed. When the card 4 passes between the magnetic heads 28 and 28 on the card-conveying line, information is read out of and written on the magnetic stripes on the top and underside of the card 4.

When the card 4 is moved to a predetermined position, this state is detected by the sensor (not shown). The motor 29 is reversely rotated responsive to output applied from the sensor. When the card chucking unit 6 is thus returned to its original position, the opening and closing system 14 is made operative to half rotate the eccentric cam 20. This causes the lever 15 to lift the upper claw 9, so that the card 4 can be released from the chucking force between the lower 8 and the upper claw 9. A part of the card 4 is kept projected outside from the card inserting opening till then. The card 4 can be therefore pulled out of the card reader and writer by fingers.

FIGS. 3 through 6 show main portions of the card reader-writers which are variations from the first embodiment of the present invention. Same components as those shown in FIG. 1 will be denoted by same reference numerals and description on these components will be omitted.

In the case of a first variation shown in FIG. 3, the position of the card inserting opening is shifted from that of the one shown in FIG. 1 by 90° and the direction in which the card chucking unit 6 is moved is also shifted from that in FIG. 1 by 90°. And one short edge portion of the card 4 is chucked between the lower 8 and the upper claw 9 of the card chucking unit 6.

When arranged in this manner, the card reader-writer can attain same merits as those in the one shown in FIG. 1.

Figure 4:
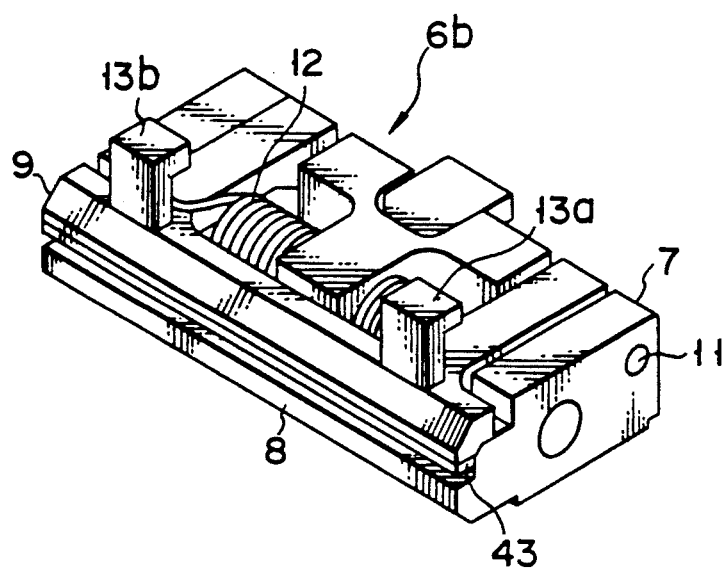
Figure 5:
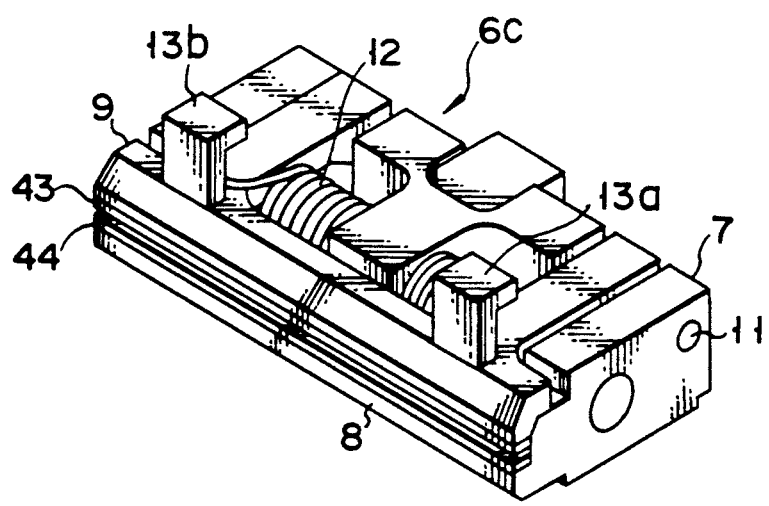

In the case of a second variation shown in FIG. 4, a elastic member 43 such as rubber is attached to the chucking area of the upper claw 9 of the card chucking unit 6 and in the case of a third variation shown in FIG. 5, elastic matters 43 and 44 are achieved to chucking areas of the upper and lower claws 9 and 8.

When arranged in this manner, the card 4 can be more stably chucked between the upper and the lower claw due to the elastic matter 43 or elastic matters 43 and 44, thereby enabling the card 4 to be more stably conveyed, too.

Figure 6:
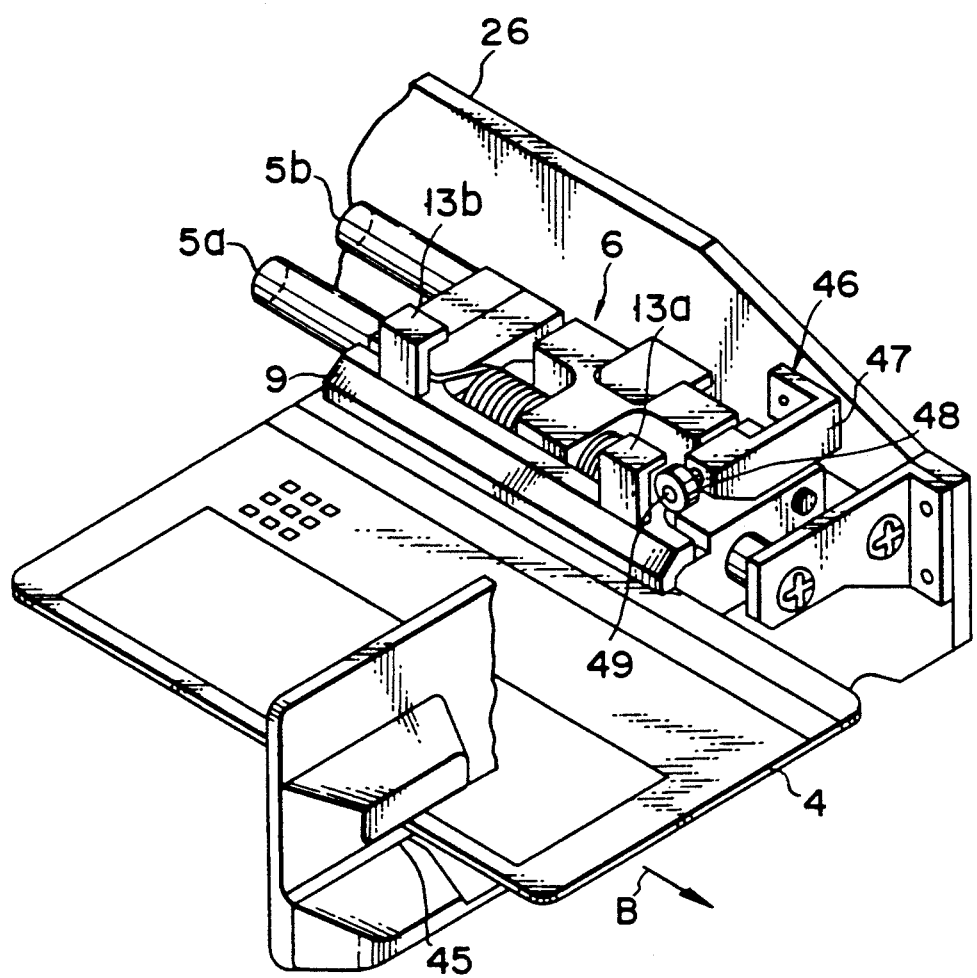
FIG. 6 is a perspective view showing the main portion of a further variation of the card reader-writer.

In the case of a further variation shown in FIG. 6, a system 46 for forcedly releasing the chucking operation of the card chucking unit 6 is located before the position at which the card chucking unit 6 is waiting, that is, on the side of a card inserting opening 45.

The releasing system 46 comprises a support member 47 which is fixed to the inner face of the side plate 2b at its base end and which is projected above the guide rods 5a and 5b at its free end, and a roller 48 attached to the free end of the support member 47. The roller 48 is freely rotatably supported by a shaft 49 which is attached to the free end of the support member 47 in such a way that the axial center line of the shaft 49 crosses the guide rod 5a in a direction perpendicular to the direction in which the guide rod 5a extends. Further, the roller 48 is also attached to the shaft 49 in such a way that the highest outer circumference of the roller 48 is higher than the height of the projection 13a of the card chucking unit 6 by about the thickness of the card 4.

When arranged in this manner the card 4 can be easily pulled out of the card reader-writer even if the card chucking unit 6 should not be opened because of power stop, for example, when the card 4 chucked by the card chucking unit 6 is returned to the waiting position of the system 6. When the card 4 is pulled in a direction shown by an arrow B in FIG. 6 in this case, the projection 13a is contacted with the roller 48 and lifted upward by the roller 48 as the card 4 is further pulled in the same direction. As the result, the upper claw 9 is swung to thereby allow the card 4 to be pulled out of the card reader-writer.

Figure 7:
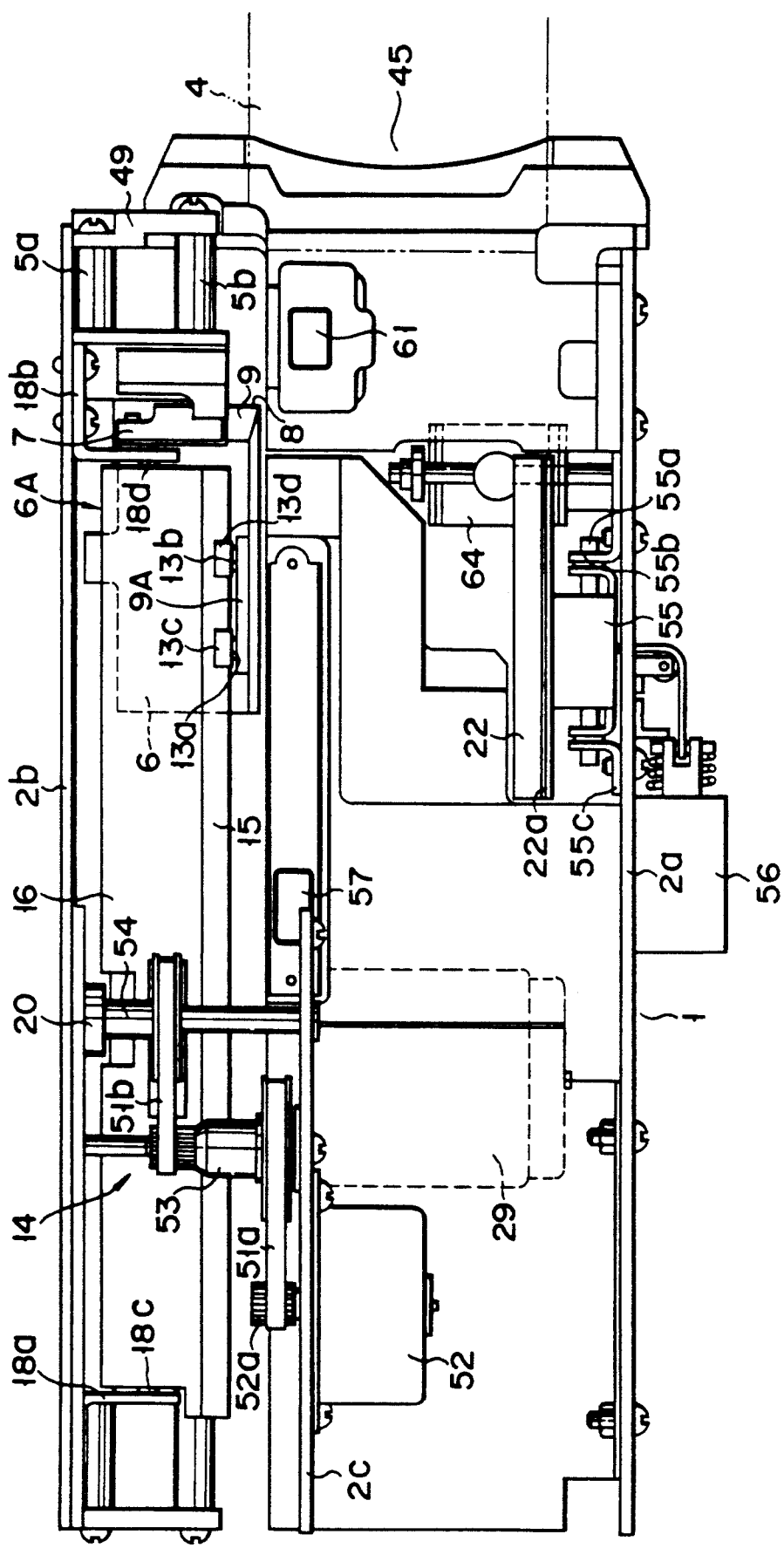
FIG. 7 is a plan showing the main portion of the card reader-wirter according to a second embodiment of the present invention.

FIG. 7 shows the card reader-writer according to a second embodiment of the present invention. This second embodiment of the present invention is designed for use with magnetic cards.

As shown in FIG. 7, a front panel 49 is located in front of the side plates 2a and 2b which form the frame 1. The front panel 49 is provided with a card inserting opening 45 through which the card 4 is inserted into the card reader-writer.

Two guide rods 5a and 5b parallel to each other are arranged adjacent to the inner face of the side plate 2b and parallel to the card-inserting direction. The carriage 6A provided with the card chucking unit 6 is freely movably supported by the guide rods 5a and 5b.

When the card 4 is inserted into the card inserting opening 45 over a certain length thereof, the card chucking unit 6 associates with the opening and closing system 14 to chuck the card 4 along the long one edge portion thereof in the thickness direction thereof. The base 7 of the card chucking unit 6 is freely movably supported by the guide rods 5a and 5b. The lower claw 8 is fixed to the base 7 and the upper claw 9 is located above the lower claw 8 and the base end of the upper claw 9 is freely swingably supported by the base 7. Similarly to the first embodiment of the present invention, the upper claw 9 is urged toward the lower claw or in the closing direction by the urging springs. Further, the pins 13a and 13b are mounted on the top of the portion 9A of the upper claw 9, erecting upward and parallel to the side plate 2b. The pins 13a and 13b are protruded toward the side plate 2b, and bearings 13c and 13d are mounted on the pins 13a and 13b, respectively. The upper claw 9 is controlled to swing toward and from the lower claw 8 by the opening and closing system 14 through the bearings 13c and 13d.

The opening and closing system 14 includes the lever 15 and a stepping motor 52. The lever 15 is located above and parallel to the guide rod 5a and contacted with the undersides of the bearings 13c and 13d. Further, the lever 15 is attached to the rotary member 16 which extends along the inner face of the side plate 2b and which is freely swingably supported by the support members 18a, 18b and pins 18c, 18d.

The stepping motor 52 is attached to an intermediate plate 2c located substantially in the center of the frame 1, and a rotating shaft 52a is projected from the stepping motor 52 to the side plate 2b. A pulley 53 and a cam shaft 54 are freely rotatably arranged parallel to the stepping motor 52 and the rotating shaft 54a of the stepping motor 52, the pulley 53 and the cam shaft 54 are connected to one another by belts 51a and 51b to form a slowing-down system.

The eccentric cam 20 is attached to the cam shaft 54 and the cam face of this eccentric cam 20 is contacted with one edge portion of the rotary member 16. When the stepping motor 52 is rotated and that outer circumference of the eccentric cam 20 which is on its larger-diameter line is thus contacted with the edge of the rotary member 16, therefore, the rotary member is swung causing the lever 15 to be contacted with at least the bearing 13d to lift the bearing 13d. When the bearing 13d is thus lifted, the card 4 chucked between the upper and the lower claw of the card chucking unit 6 is released. When the stepping motor 52 is further half rotated, that outer circumference of the eccentric cam 20 which is on its smaller-diameter line is contacted with the edge of the rotary member 16. As the result, the card 4 is chucked between the upper and the lower claw of the card chucking unit 6. The opening and closing system 14 is operated in this manner to open and close the card chucking unit 6.

Located along the inner face of the side plate 2a is the guide member 22 for guiding the other free long edge portion of the card 4 to position the card 4 in the width direction thereof. A elastic sheet 22a having high coefficient of friction such as rubber is attached to the surface of the guide member 22, which contacts the side surface of the edge portion of the card 4, by adhesion. The guide member 22 is supported by a support lever 55, which is pivoted on the side plate 2a by mounting plates 55b, 55c and pins 55a. A drive solenoid 56 is connected to the lower end of the support lever 55 and the guide member 22 is driven by the solenoid 56.

The motor 29 for conveying the card 4 is arranged below the guide rod 5a. The rotation force of this motor 29 is transmitted through the belts and the pulleys, as seen in the case of the first embodiment, to move the card chucking unit 6 along the guide rods 5a and 5b.

A prehead 61 which is contacted with magnetic stripes on the underside (or top) of the card 4 to detect magnetism is located along and adjacent to the guide rod 5a and a magnetic head 57 which is contacted with magnetic stripes on the underside (or top) of the card 4 to read and write information is also located along and adjacent to the guide rod 5a.

Figure 8:
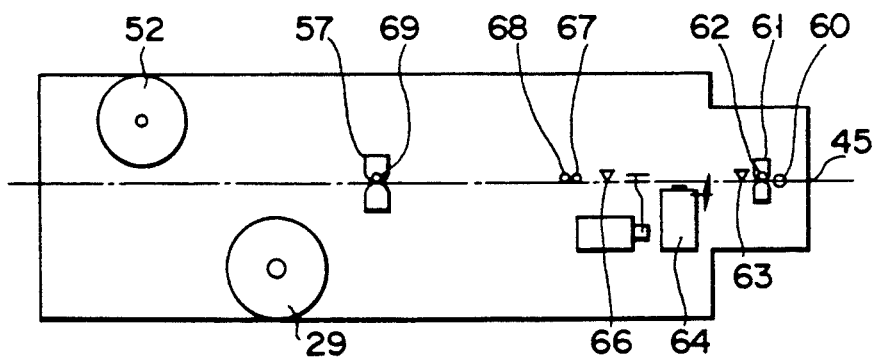
FIG. 8 schematically shows the arrangement of sensors and actuators in the card reader-writer.

Sensors and actuators incorporated into the second embodiment of the card reader-writer will be described referring to FIGS. 8 and 9.

A card detecting sub-sensor (SW) 60, the prehead (PHD) 61 and a first card sensor (PD1) 62 which form a card checking unit for previously examining the card 4 inserted are arranged adjacent to the card inserting opening 45 of the card reader-writer. The card detecting sub-sensor 60 detects whether or not the card inserted has a predetermined width. The prehead 61 detects the magnetic stripes on the card 4 to confirm the direction in which the card 4 is directed. The first card sensor 62 detects the insertion of the card 4.

A first carriage sensor (CRS1) 63 is arranged adjacent to the card checking unit to detect the position of the rear end of the retreated carriage 6A. A stopper solenoid (SOL1) 64 is arranged in front of the sensor 63 to prevent wrong cards from being inserted into the card reader-writer and to define the position of the card inserted.

A card position adjusting section is located in front of the stopper solenoid 64. The card position adjusting section includes the card position adjusting solenoid (SOL2) 56, a second carriage sensor (CRS2) 66 and second and third card sensors (PD2 and PD3) 67 and 68. The second and third card sensors 67 and 68 are located one after another and adjacent to each other. The card 4 adjusted in position is detected by the second card sensor 67 to stop the advancing carriage 6A and the accurate relative positions of the card and the carriage are detected by the third card sensor 68 and the second carriage sensor 66 to position the card 4. The read/write and start position of the card 4 is set by the third card sensor 68. The card position adjusting solenoid (SOL2) 56 drives the guide member 22 to urge the card 4, which is in a position to be adjusted, traverse to adjust the position of the card 4 in the traverse direction.

A fourth card sensor (PD4) 69 and a read/write head 57 are arranged in front of the card position adjusting section. When the fourth card sensor 69 detects the card 4, the read/write head 57 starts its reading and writing relative to the magnetic stripes on the card 4.

The stepping motor (SMOT) 52 is arranged in front of and above the read/write head 57 and the carriage moving motor (CMOT) 29 is arranged below the read/write head 57.

Figure 9:
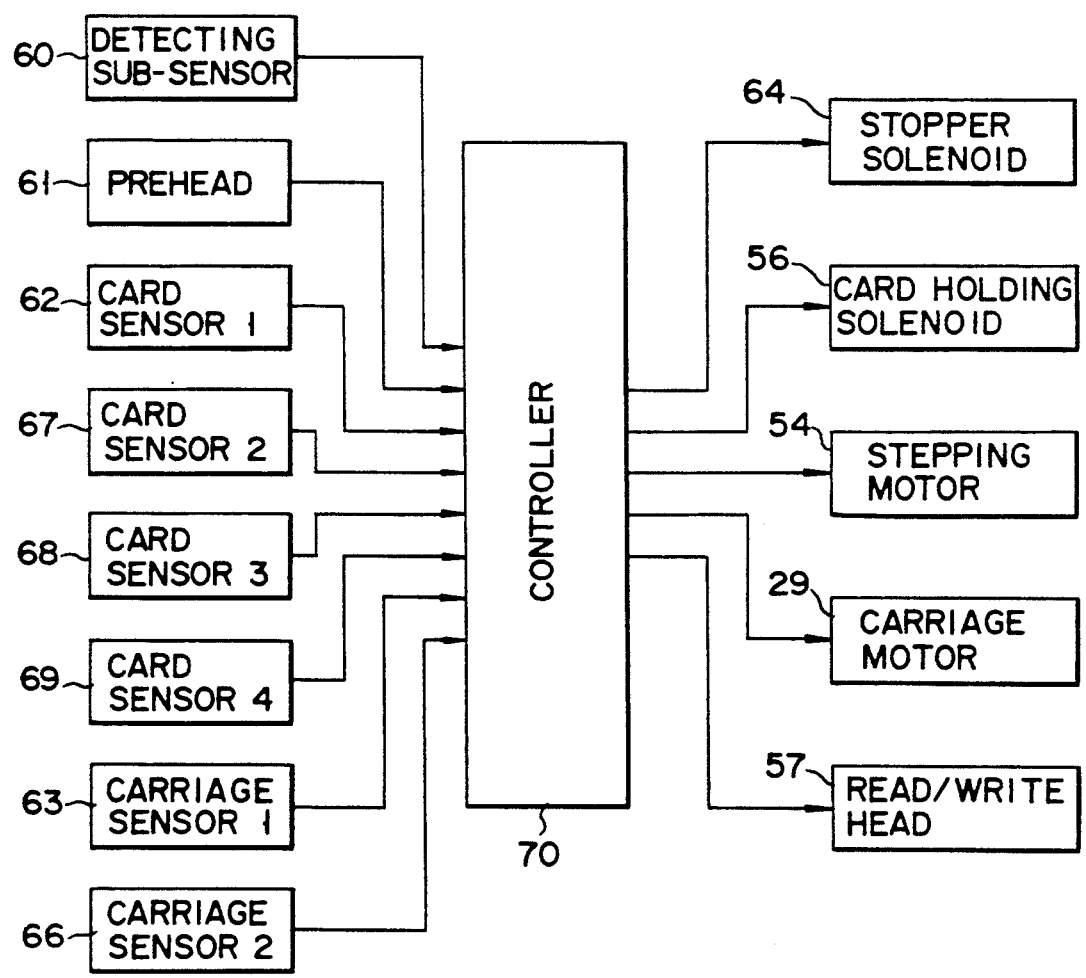
FIG. 9 is a block diagram showing a control section in the card reader-writer.

As shown in FIG. 9, these sensors and actuators are connected to a controller 70 provided with a CPU.

Figure 10:
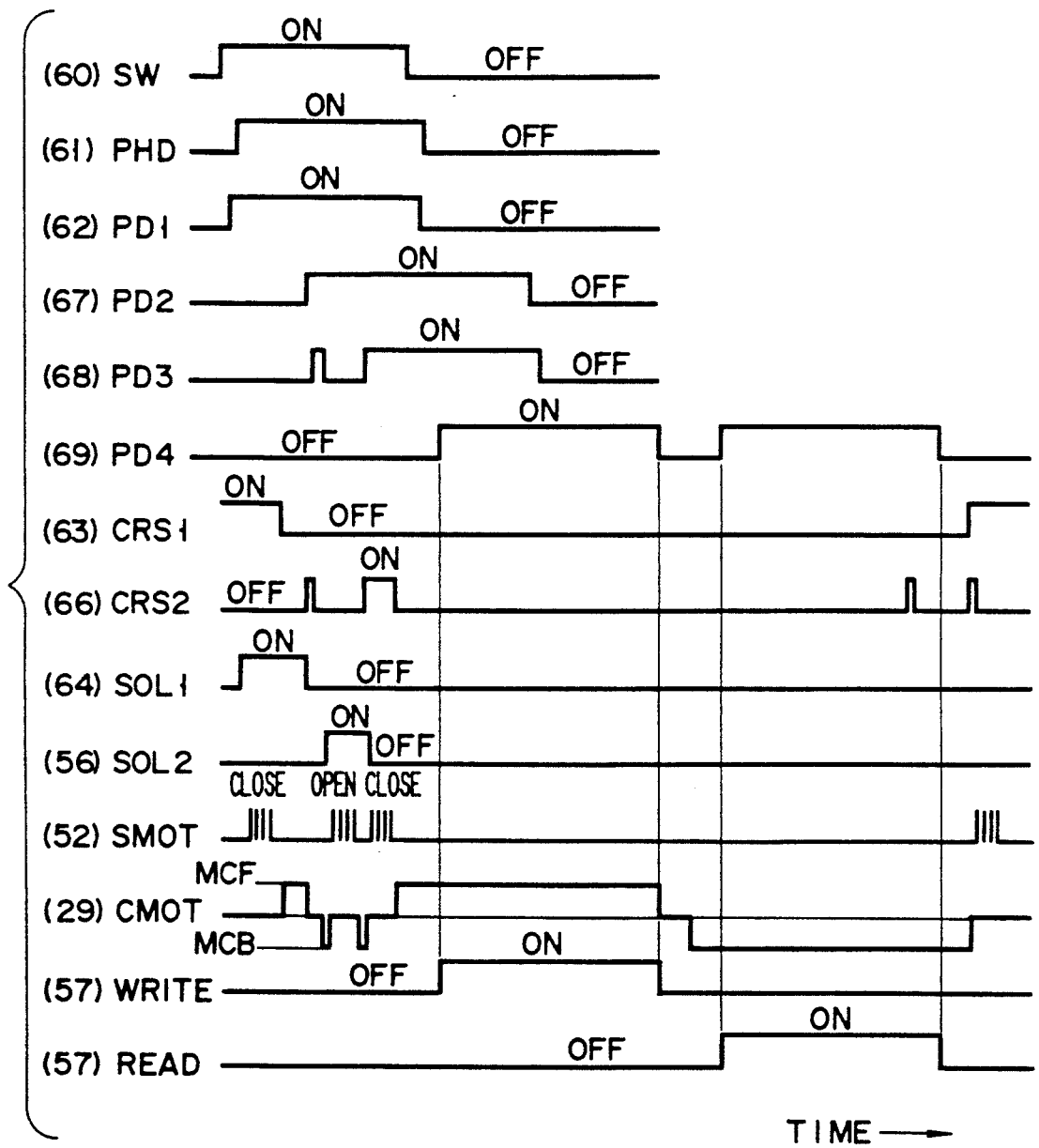
FIG. 10 is a timing chart showing how the sensors and the actuators in the card reader-writer are made operative.

The operation of the card reader-writer which is arranged as described above will be described with reference to a time chart shown in FIG. 10.

The carriage 6A provided with the card chucking unit 6 is waiting on the side of the card inserting opening 45 under normal state. When the carriage 6A is under this waiting state, the card chucking unit 6 is kept open. When the card 4 is inserted into the card inserting opening 45 under this state, the state of the card 4 is detected by the card width detecting sub-sensor (SW) 60, the prehead (PHD) 61 and the first card sensor (PD1) 62. Signals applied from these sensors are sent to the controller 70 and when it is confirmed that the card is normal or right, the controller 70 makes the stopper solenoid (SOL1) 64 operative to open the card passage and half rotate the stepping motor 52 of the opening and closing system 14. The lever 15 is thus lowered and the card chucking unit 6 is closed to chuck the one long edge portion of the card 4 between the upper 9 and the lower claw 8 with a certain force.

When this card chucking operation is finished, the motor 29 starts it rotation in the forward direction (MCF). The card chucking unit 6 is thus moved forward and the card 4 is also moved forward. When the card 4 reaches the card position adjusting section, the second card sensor (PD2) 67 detects the card 4 and the motor 29 is stopped while the stopper solenoid 64 is turned off in response to signal applied from the solenoid 67.

The carriage 6A and the card 4 are then moved forward by inertia of the motor (CMOT) 29. When the third case sensors (PD3) 68 detects the card 4, the motor (CMOT) 29 rotates in the backward direction (MCB) to stop the carriage 6A and the card 4 chucked therein at the read/write start position. When carriage 6A is stopped and the card 4 is at the read/write start position, the stepping motor (SMOT) 52 is operated, as illustrated in FIG. 10, to open the card chucking unit 6. Then, the card holding solenoid (SOL2) 56 is adjusting the position of the card 4 in the traverse direction while holding the card 4 at the certain position (or read/write and start position).

After the position of the card 4 is adjusted in the traverse or lateral direction (i.e., perpendicular to the transferring direction) the motor 29 is then rotated backward to position the carriage 6A at the second carriage sensor (CRS2) 66, if the carriage 6A is not already at the sensor. The motor 29 is controlled this time in response to signal applied from the second carriage sensor 66. During this movement, the chucking unit 6 remains open, and the card is adjusted in the transverse direction. When the carriage 6A is positioned, the card holding Solenoid is turned off and the stepping motor again operates to close the card chucking unit 6.

When the position adjusting of the card 4 in the lateral and transverse directions and the carriage 6A is finished, the motor 29 rotates in the forward direction (MCF) to move the card 4 forward. And the card 4 passes on the magnetic head 57 arranged on the card conveying passage. When the fourth card sensor 69 detects the card 4 in this case, writing (or reading) of information is started on the magnetic stripes on the underside (or top) of the card 4.

When the card 4 is further moved to the certain position, off-signal is generated by the fourth card sensor 69. After the carriage 6A is stopped about 0.5 seconds, the controller 70 makes the motor 29 to rotate in the backward direction (MCB) responsive to this off-signal. The carriage 6A is thus retreated. When the carriage 6A is retreated, the card 4 again passes on the magnetic head 57 and writing (or reading) of information is carried out on the magnetic stripes formed on the underside (or top) of the card 4.

When the carriage 6A is returned to its original position, the first carriage sensor 63 detects the carriage 6A and the stepping motor 52 is half rotated to open the card chucking unit 6. A part of the card 4 is projected outside from the card inserting opening 45 under this state. Therefore, the card 4 can be pulled out of the card reader-writer by hand.

In the case of the above-described embodiments of the present invention, only the magnetic head is shown as an element for transmitting and receiving information to and from the card. In the case of IC cards, however, a connective system for transmitting and receiving signals is provided in addition to the magnetic head. Further, the urging springs for adding chucking force to the card chucking unit are selected depending upon what type of the card chucking unit is employed.

The carriage conveying system in the above-described embodiments uses belts running in the carriage conveying direction, but ball screws and nuts which are rotated by a motor may be used.

The card reader-writer of the present invention has the above-described card chucking, carrying and positioning systems. Therefore, those cards which are curved in a certain range, partly bent and deformed to corrugated ones can be used for the card reader-writer. Further, those cards which have any small error in dimension and any cracks and broken spots and to which cellophane tape adheres can also be used.

It should be understood that the present invention is not limited to the above-described embodiments and their variations and that various modifications and changes can be made without departing from the spirit and scope of the present invention.

What is claimed is:

1. A card reader-writer comprising:
    a body having a card inserting opening into which a card to which reading and writing of information can be made is inserted;
    read/write means arranged in the body to read and write information from and on the card;
    means for carrying the card which is inserted into the card inserting opening to the read/write means, said carrying means including means for chucking the card at one lateral edge portion of the card, guiding means for guiding said chucking means between the card inserting opening and the read/write means, and means for moving the chucking means along said guiding means; and
    means for adjusting a positional relationship between the card and the chucking means.

2. The card reader-writer according to claim 1, wherein said guiding means comprises a guide rail for guiding the chucking means.

3. The card reader-writer according to claim 1, wherein said guiding means comprises two guide rails.

4. The card reader-writer according to claim 1, wherein said chucking means has means for chucking the card at one edge portion of the card except a magnetic stripe thereof.

5. The card reader-writer according to claim 4, wherein said chucking means has means for chucking the card at two thirds area of the edge portion.

6. The card reader-writer according to claim 1, wherein said chucking means includes a card chucking surface and a pad attached to the card chucking surface.

7. The card reader-writer according to claim 1, wherein said position adjusting means includes means for urging the card which is chucked in the thickness direction of the card by the chucking means in the traverse direction.

8. The card reader-writer according to claim 7, wherein said urging means includes an urging spring.

9. The card reader-writer according to claim 7, wherein said urging means includes an actuator having an electromagnet.

10. The card reader-writer according to claim 1, further comprising means located near that waiting position of the chucking means which is adjacent to the card inserting opening and serving to release the card from the chucking means when force higher than a certain value is applied in the card discharging direction to the card chucked by the chucking means.

11. The card reader-writer according to claim 1, wherein said adjusting means includes means for temporarily opening the card chucking means to release the card for adjusting the positional relationship between the card and the chucking means after the card chucked by the chucking means is temporarily released from the chucking means.

12. A card reader-writer apparatus comprising:
read-write means for accessing a card;
chucking means for chucking a card which is inserted into the reader-writer apparatus through a card insertion opening thereof in a lengthwise direction and said chucking means chucks a longer side edge of the card;
first guide means for guiding said chucking means between the card inserting opening and said read-write means;
means for transferring said chucking means along said first guide means; and
second guide means for, when the card is transferred by said transferring means, guiding a portion of the card which is other than a portion of the card which is chucked by said chucking means.

13. An apparatus according to claim 12, wherein said first guide means comprises two guide poles arranged between said card inserting opening and said read-write means, and said chucking means is slidably mounted on said guide poles.

14. An apparatus according to claim 12, wherein said chucking means comprises a pair of claws for chucking the card and an elastic member, provided on a chucking area of the claws, for increasing a chucking grip of the claws.

15. An apparatus according to claim 12, wherein said chucking means comprises a pair of claws which are energized to be closed for chucking the card, means for opening the pair of claws when the card is inserted into the card inserting opening, and means provided at the card inserting opening, for urging one of the claws away from the other claw when the card is pulled out from the chucking means.

16. A method for transferring a card which is inserted into an apparatus having a card read/write section, comprising the steps of:
(a) chucking, by means of a chucking means, the card which inserted into an apparatus through a card inserting opening;
(b) transferring the chucking means to a start position;
(c) temporarily opening the chucking means to release the card;
(d) aligning the card relative to the chucking means when the card is released from said chucking means; and
(e) transferring said chucking means to the card read/write section.

17. A method according to claim 16, wherein said aligning step (d) includes the substeps:
urging the card in a lateral direction; and
shifting the chucking means in at least one of a forward and backward direction.

18. A card reader-writer apparatus comprising:
read-write means for accessing a card;
a card inserting opening through which the card is inserted into the card reader-writer apparatus;
means for chucking a card;
means for transferring said chucking means from the card inserting opening to a start position while the card is being chucked;
means for temporarily opening said chucking means to temporarily release the card;
means for urging the card in a lateral direction of the card when the card is released from said chucking means; and
means for transferring said chucking means from the start position to said read-write means while the card is being chucked.

19. A card reader-writer apparatus comprising:
read-write means for accessing and writing information from and on a card;
a card inserting opening through which the card is inserted into the card reader-writer apparatus;
means for chucking the card;
means for transferring said chucking means from the card inserting opening to a start position while the card is being chucked;
means for temporarily opening said chucking means to temporarily release the card;
means for transferring said chucking means when the card is released; and
means for transferring said chucking means from the start position to said read-write means while the card is being chucked.

20. A card reader-writer apparatus comprising:
read-write means for accessing and writing information from and on a card;
a card inserting opening through which the card is inserted into the reader-writer apparatus;
means for chucking a card;
means for transferring said chucking means from the card inserting opening to a start position while the card is being chucked;
means for temporarily opening said chucking means to temporarily release the card;
means for aligning the card relative to the chucking means when the card is released from said chucking means; and means for transferring said chucking means from the start position to said read-write means while the card is being chucked.

21. An apparatus according to claim 20, wherein said aligning means comprises means for urging the card in the lateral direction of the card and means for transferring said chucking means when the card is released.

22. An apparatus according to claim 20, further comprising a guiding means including two guide poles arranged between said inserting opening and said read-write means, and said chucking means is slidably mounted on said guide poles.

23. An apparatus according to claim 26, wherein the card is inserted into said card inserting opening in a lengthwise direction and said chucking means chucks a longer side edge of the card.

24. An apparatus according to claim 20, wherein the card is inserted into said card inserting opening in a widthwise direction and said chucking means chucks a shorter side edge of the card.

25. An apparatus according to claim 20, wherein said chucking means comprises a pair of claws for chucking the card and an elastic member, provided on an area of the claws, for increasing a chucking grip of the claws.

26. An apparatus according to claim 20, wherein said chucking means comprises a pair of claws which are energized to be closed for chucking the card, means for opening the pair of claws when the card is inserted into the card inserting opening, and means provided at the card inserting opening, for urging on of the claws away from the other claw when the card is pulled out from the chucking means.

27. An apparatus according to claim 20, further comprising a guide means for, when the card is transferred by said transferring means, guiding a portion of the card which is other than a portion of the card which is chucked by the chucking means.

28. An apparatus according to claim 27, wherein said guide means comprises a C-shaped guide member.

29. A card reader, comprising:
a body having a card inserting opening for receiving a card;
read means arranged in the body for reading information from the card;
at least one guide rod contained within said body;
means for clamping the received card at one edge portion thereof, slidably mounted on said at least one guide rod; and
means for slidably transporting the clamping means and the card clamped therein from the card inserting opening to said read means along said at least one guide rod.

30. A card reader according to claim 29, further comprising:
means for adjusting a positional relationship between the card and said means for carrying the card.

31. A card reader according to claim 29, wherein the means for clamping comprise a pair of claws for clamping the card.

32. A card reader according to claim 29, wherein the means for clamping clamps the card at only one edge portion thereof.

33. A card reader according to claim 29, wherein the means for clamping clamps the card at only a longer side of the card.

34. An apparatus according to claim 12, wherein said second guide means comprises a C-shaped guide member.

* * * * *